United States Patent [19]

Amstad

[11] 4,258,069
[45] * Mar. 24, 1981

[54] METHOD FOR CONTINUOUS PRODUCE SURFACE TREATMENT

[75] Inventor: John H. Amstad, Alameda, Calif.

[73] Assignee: Atlas Pacific Engineering Company, Emeryville, Calif.

[*] Notice: The portion of the term of this patent subsequent to Oct. 28, 1997, has been disclaimed.

[21] Appl. No.: 11,392

[22] Filed: Feb. 12, 1979

[51] Int. Cl.³ .............................................. A23N 7/00
[52] U.S. Cl. ...................................... 426/483; 15/3.2; 99/626; 134/6; 426/519
[58] Field of Search .............. 426/481, 482, 483, 519, 426/478; 99/623, 624, 625, 626, 628, 629; 15/3.13, 3.16, 3.2, 3.21; 134/6, 32, 33

[56] References Cited

U.S. PATENT DOCUMENTS

| | | | |
|---|---|---|---|
| 790,834 | 5/1905 | Harvey | 15/3.2 |
| 1,058,461 | 4/1913 | Porter | 15/3.16 |
| 3,134,413 | 5/1964 | Dorsa et al. | 99/629 |
| 3,460,162 | 8/1969 | Sijbring | 426/483 |
| 4,062,985 | 12/1977 | Amstad | 426/483 |

Primary Examiner—S. Leon Bashore
Assistant Examiner—Michael Goldman
Attorney, Agent, or Firm—Fishburn, Gold and Litman

[57] ABSTRACT

Method for removing material from the surface of fruits and vegetables (produce) and separating the removed material from the resultant mixture utilizes the rotation of an upwardly directed cage formed of elongated rotating spindles having a material removing surface thereon, the cage rotary speed being sufficient, at the interior radius thereof, to maintain the produce in continuous centrifugal force contact against the spindle material removing surface, but generally insufficient to prevent downward movement or migration of the produce within the cage under the force of gravity. Produce to be treated is urged into engagement with the spindles and the rotating cage causes the produce to accelerate substantially to said rotary speed, whereby the produce travels with the cage in contact with the rotating material removing spindle surfaces. The produce moves downwardly through the cage under the force of gravity, but is restrained from moving downwardly as fast as conditions would otherwise dictate by resisting surface contact against the lower portions of the produce, thereby increasing cage residence time. The resisting surface is displaced downwardly during cage rotation so as to control the descent of the produce downwardly through the cage during treatment. The removed material is continuously separated from the produce by centrifugal force which may be aided by air suction.

7 Claims, 47 Drawing Figures

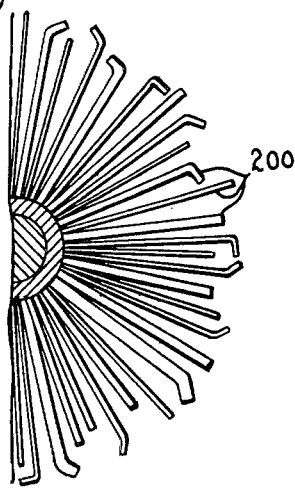
Fig. 30.
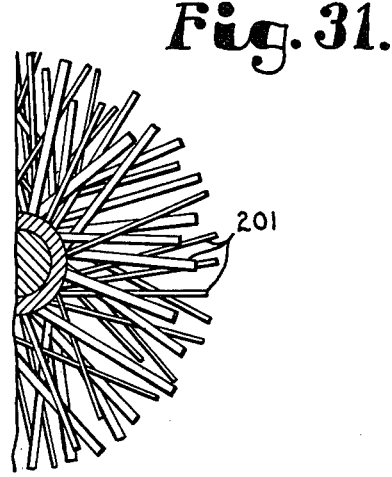
Fig. 31.
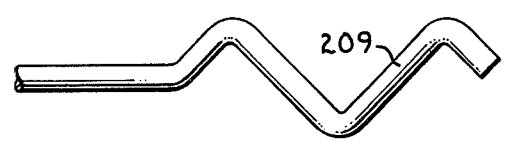
Fig. 34.
Fig. 32.
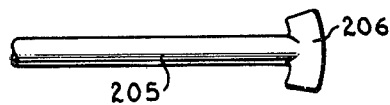
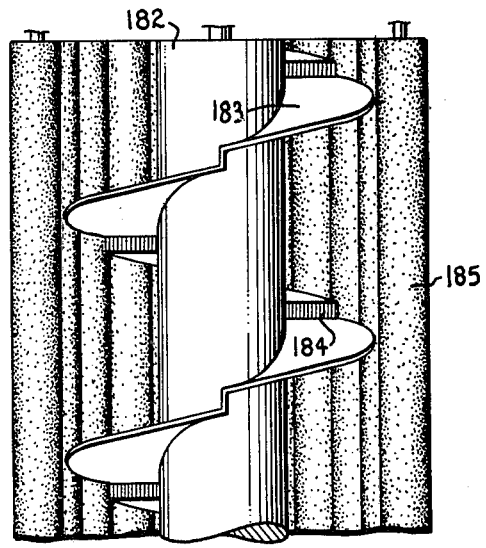
Fig. 24a.
Fig. 33.

METHOD FOR CONTINUOUS PRODUCE SURFACE TREATMENT

BACKGROUND OF THE INVENTION

It has long been recognized that the cleaning and/or peeling of fruits and vegetables (produce) at a high rate with minimal waste and handling damage is important in the food processing industries. Attempts to accomplish this have presented difficult problems due to many factors, including the highly irregular surfaces of certain produce, such as potatoes, the substantial variation in optimum abrasive surface pressure, the susceptibility of some produce to handling damage, differences in epidermis characteristics of different produce types and different species of the same type, the ever increasing difficulties in disposing of waste wash water and treating chemicals and the recent substantial increase in the cost of energy for producing steam, hot water or radiant heat for certain related operations.

High capacity produce peeling and cleaning devices have been utilized for many years, as exemplified in U.S. Pat. Nos. 3,134,413; 3,566,942 and 3,946,658. Such devices relied upon gravitational tumbling of produce groups in a generally horizontally oriented, rotating, peeling cage constructed of rotating abrasive spindles, with a revolving auger therein for moving the tumbling groups therealong. A new concept was presented in U.S. Pat. Nos. 4,062,985 and 4,068,574 wherein the peeling cage accelerated the produce to a rotary speed sufficient for maintaining the produce in continuous centrifugal force contact against the spindle abrading surfaces. This greatly improved the potential cleaning and/or peeling efficiency by presenting a many fold increase in functioning abrasive surface area within the cage, while also permitting highly accurate control of produce pressure thereagainst by merely varying the cage speed. Further, the new arrangement reduced the likelihood of produce damage by substantially decreasing tumbling.

Although the improved method and apparatus disclosed in said U.S. Pat. Nos. 4,062,985 and 4,068,574 constituted a marked improvement over prior art devices, some difficulty was experienced in accurately controlling the residence time of the produce within the treating cage. It was also recognized that certain variations in the abrasive surface of the cage spindles were desirable for optimum utilization of the new produce treating arrangement.

SUMMARY OF THE INVENTION

The present invention provides a produce surface treating apparatus and method which incorporates the new concept presented in U.S. Pat. Nos. 4,062,985 and 4,068,574, while further permitting optimum utlization thereof, by providing highly accurate control over cage residence time. This is accomplished, in certain embodiments, by the novel incorporation of auger or spiral fall inhibiting arrangements with the upwardly directed, high speed cage, whereby the auger or spiral is not used primarily to drive gravitationally tumbling groups of fruits or vegetables axially through the cage but, rather, functions to resist the gravitationaly induced downward travel of the produce therethrough. By careful maintenance of relative rotational speeds between the cage and auger, produce residence time within the cage is controlled in absence of appreciable interference with optimum produce treatment and with minimal produce tumbling. The invention herein further comtemplates several novel variations in the cage spindle abrading surface, so as to provide efficient and appropriate treatment for a great variety of fruits and vegetables, with minimal or no need to combine with steam, wash water, chemical or other auxiliary processing operations. Also, certain forms of the invention involve special configurations of spindle surface to aid in properly orienting and relatively moving irregularly shaped produce for even, predicatable treatment with minimum waste.

OBJECTS OF THE INVENTION

The principal objects of the present invention are: to provide an improved high capacity produce cleaning and/or peeling apparatus and method; to provide such an apparatus and method which permits accurate residence time control in a gravity travel, centrifugal type, spindle treating cage; to provide such a cleaning and/or peeling apparatus and method which allows optimum utilization of surface treating area and pressure; to provide such an apparatus and method wherein produce having irregular shapes, and particularly various elongated shapes, are properly oriented with respect to abrading spindles for efficient treatment with minimum waste; to provide such an apparatus and method which more fully utilizes a continuous flow, centrifugal force treating cage for high production rates; and to provide such a treating system and method which is positive in function, economical in operation and extremely well adapted for its intended purpose.

Other objects and advantages of this invention will become apparent from the following detailed description taken in connection with the accompanying drawings wherein are set forth by way of illustration and example certain embodiments of this invention.

The drawings constitute a part of this specification and include exemplary embodiments of this invention for illustrating various objects and features thereof.

BRIEF DESCRIPTION OF THE DRAWINGS

FIG. 14b is a fragmentary side elevation, on an enlarged scale, showing a portion of the mating spindles of FIG. 14a.

FIG. 20 is a fragmentary horizontal cross-sectional view through a cage illustrating further the arrangement of FIG. 19a.

FIG. 21b is a fragmentary side elevation showing a modified spindle cage arrangement utilizing the cylindrical treating cage spindles of FIGS. 2 and 5 in combination with the retaining bars of FIG. 21a.

FIG. 22 is a fragmentary horizontal cross-sectional view through a cage, further illustrating the structure of FIG. 21a.

FIG. 24a is a fragmentary side elevation showing a modified form of plain flight auger which utilizes intermediate flight drops to encourage produce mixing.

FIGS. 25 through 31 are fragmentary cross-sectional views of individual cage spindles, illustrating various bristle configurations.

FIGS. 32, 33 and 34 are fragmentary views, on a greatly enlarged scale, illustrating selected variations in specific bristle form.

DESCRIPTION OF THE ILLUSTRATED EMBODIMENTS

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
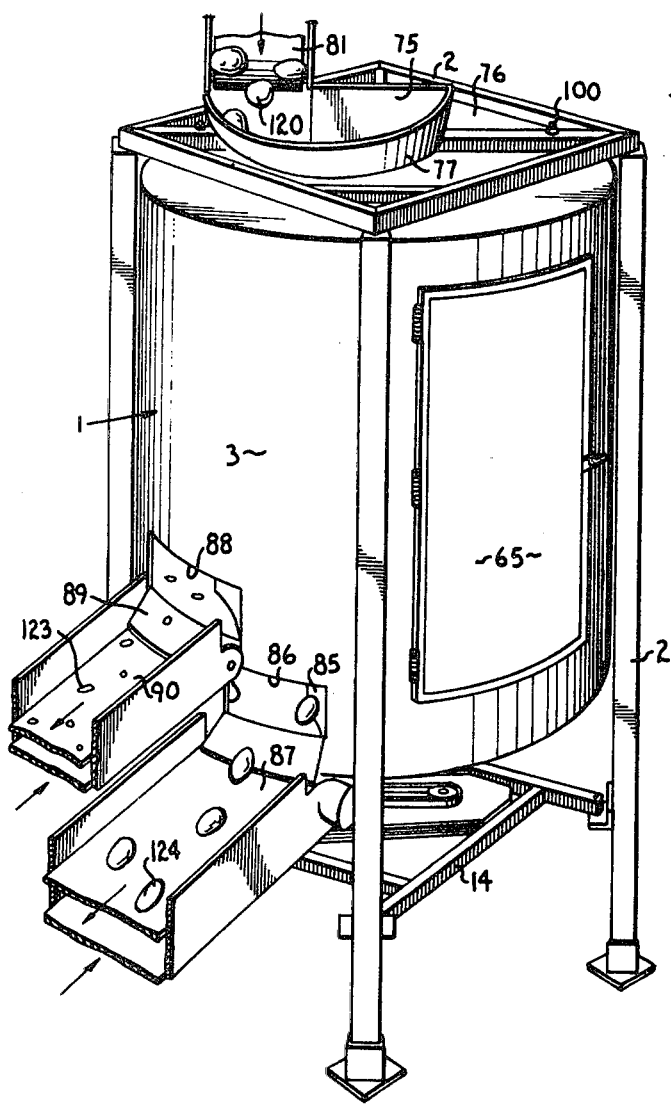
FIG. 1 is a perspective view of an exemplary peeling apparatus embodying this invention, showing representative conveyors feeding produce into the top thereof and receiving peelings and peeled produce at lower positions thereof.

The reference numeral 1, FIG. 1, generally designates apparatus for cleaning and/or peeling vegetables and fruit, herein called "produce", such as potatoes, apples, carrots, beets, onions, etc. continuously at high production rates.

Figure 2:
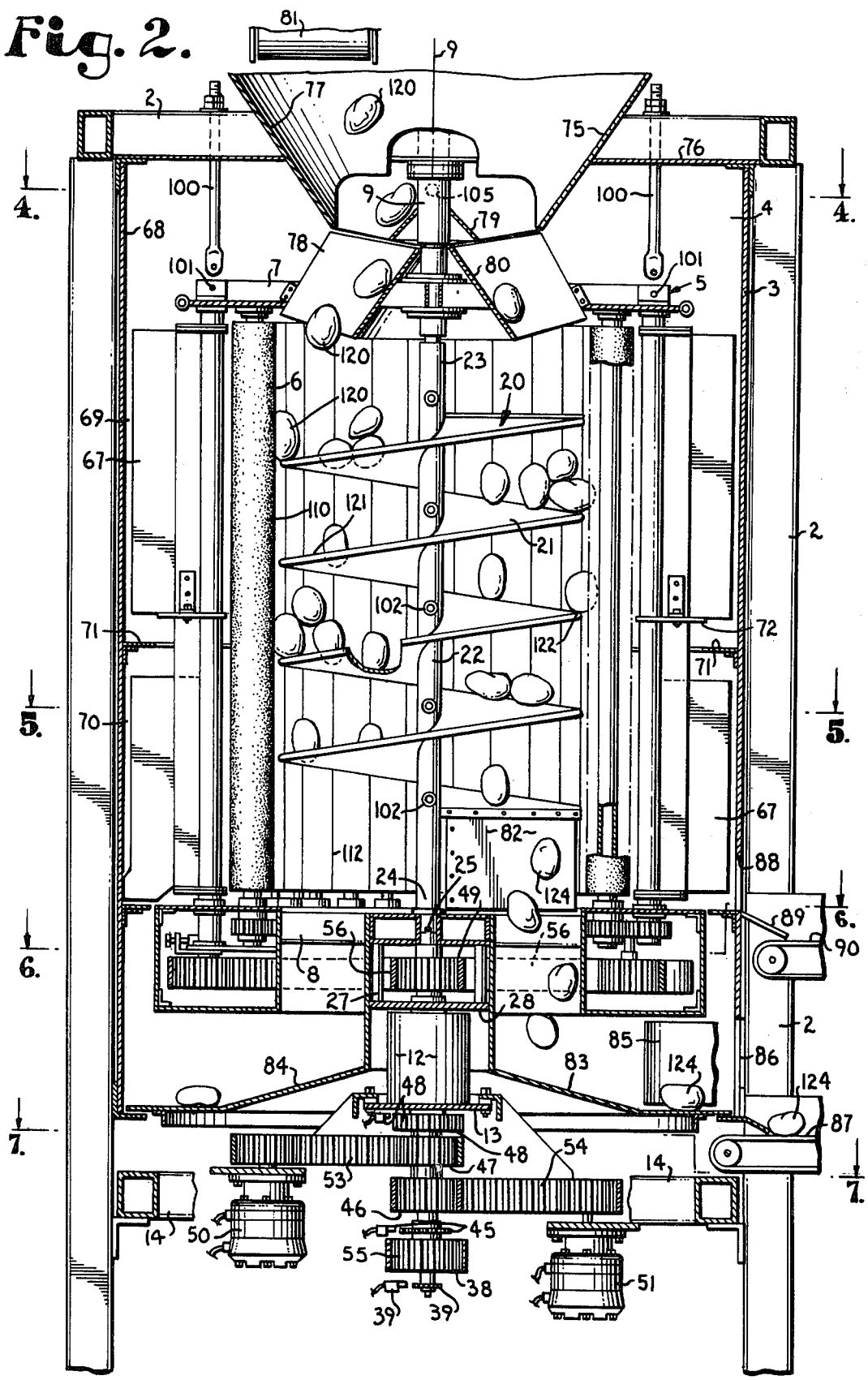
FIG. 2 is a vertical cross-sectional view through the apparatus of FIG. 1 showing the internal arrangement including cylindrical brush spindles and a plain flight, central auger.
Figure 5:
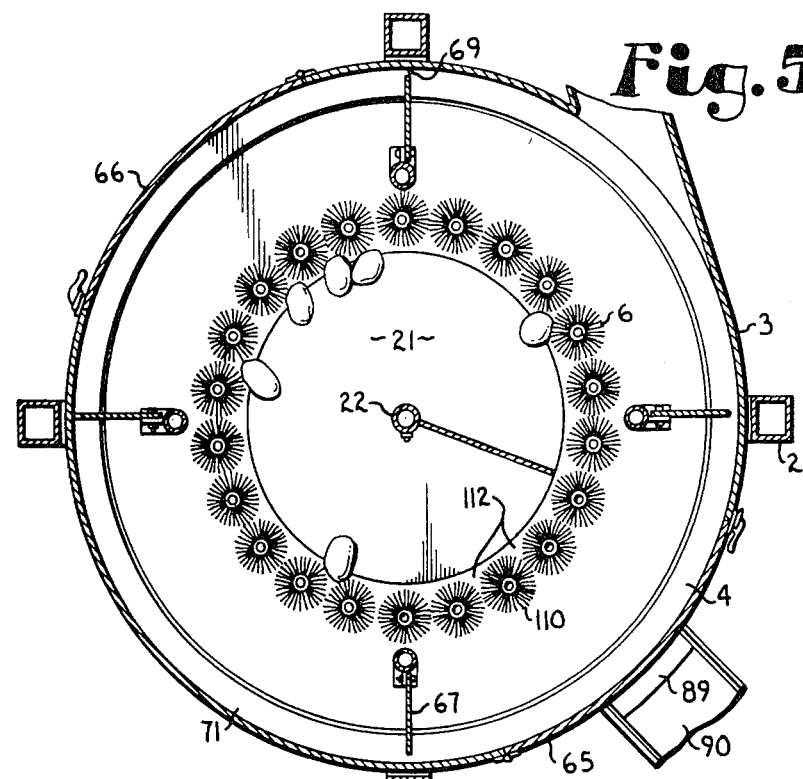
FIG. 5 is a horizontal cross-sectional view taken on the line 5—5, FIG. 2 particularly showing the relationship between the residence time control auger, or central member, and cage spindles.
Figure 10:
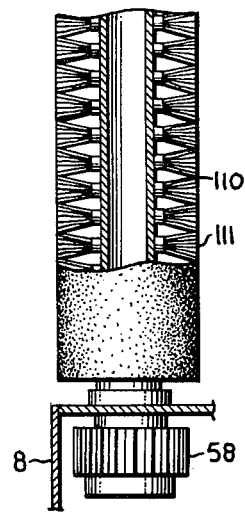
FIG. 10 is a fragmentary, partially cross-sectional view of a FIG. 2 cage spindle, on an enlarged scale, showing the produce abrading or treating surface in the form of straight or cylindrical bristle brushes.

The apparatus 1 includes a support frame 2 elevating a housing 3 having therein a treating chamber 4, FIG. 2. The chamber 4 contains an upwardly oriented treating cage 5 formed, in this example, from a plurality of elongated treating spindles 6 maintained axially parallel and circumferentially spaced, as best shown in FIGS. 2 and 5. The spindles 6 are rotatably mounted at opposite ends thereof, respectively, on upper and lower radial bearing mounts 7 and 8 which extend inwardly toward the cage axis 9. The treating cage 5, through the lower bearing mount 8, is rotatably supported by bearings 10 and 11 contained in a bearing housing 12 secured on a mounting plate 13 forming a portion of a drive assembly support 14. The cage upper bearing mount 7 is rotatably supported by appropriate bearing structure 15, FIG. 8.

A lead screw or auger 20, in the example of FIG. 2, is contained coaxially within the treating cage 5 and comprises flights 21 which present a smooth, continuous, helical, metallic upper surface, however, this surface may be softened by a layer of an appropriate resilient material with or without abrasive characteristics (not shown). The flights 21 extend into contact, or just short of contact, with the treating spindles 6 and preferably slope radially outwardly and downwardly so that items thereon gravitate toward contact with said spindles.

Figure 8:
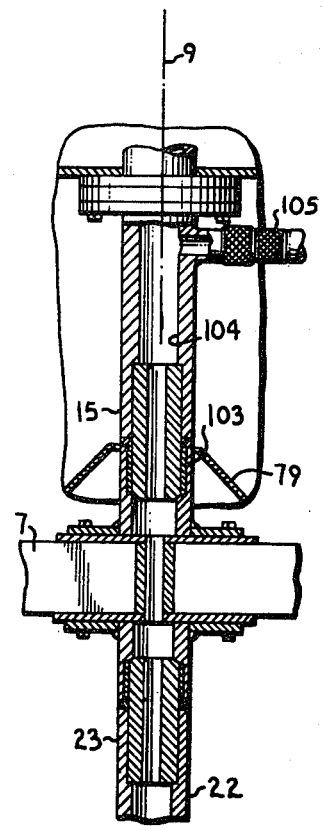
FIG. 8 is a fragmentary cross-sectional view of the auger axle at the upper portion of the apparatus, showing liquid introduction capabilities.
Figure 9:
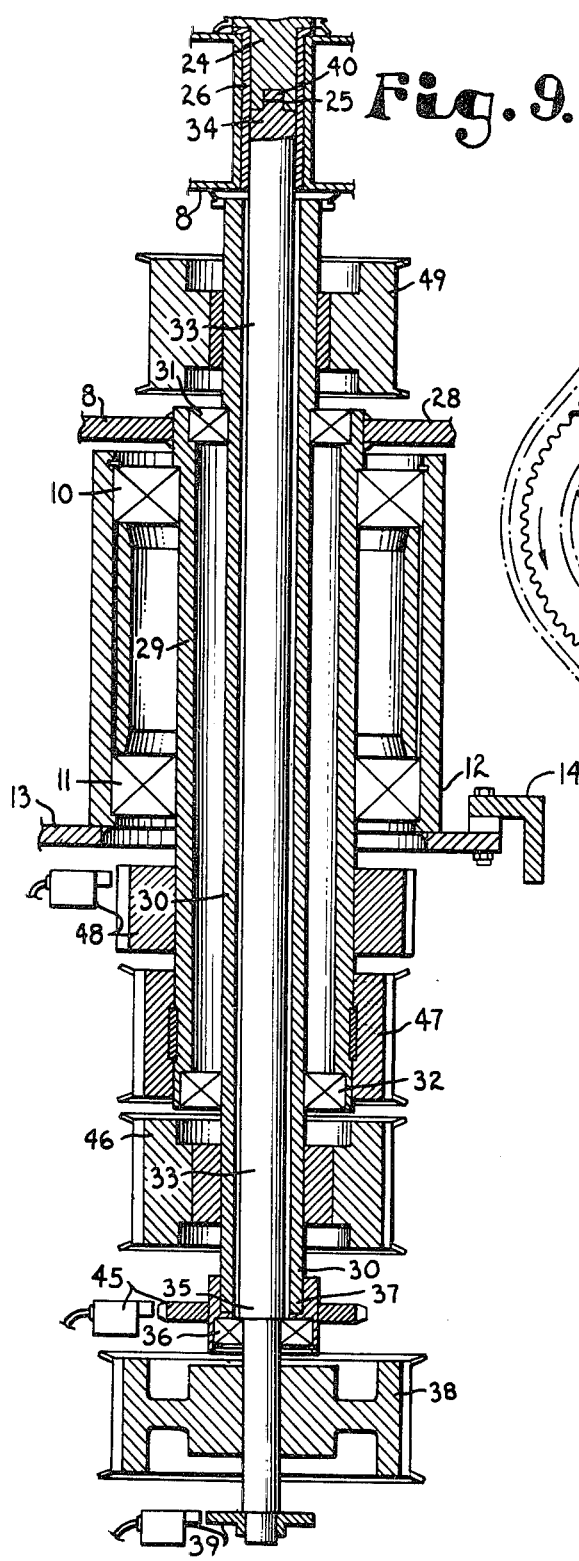
FIG. 9 is a fragmentary vertical cross-sectional view of the coaxial drive arrangement by which the cage, spindles and auger may be independently controlled in rotational speed.

The flights 21 are secured to a central axle or shaft 22 which, at the upper end 23 thereof, is rotatably mounted with respect to the cage upper bearing mount 7, FIG. 8. The lower end 24 of the shaft 22 terminates in a coupling driving key slot 25 and bears upon the collar of a sleeve bearing 26 on which the downward weight of the auger is supported while permitting rotation thereof, FIG. 9. The sleeve bearing 26 is received in a structural mounting assembly 27 which forms part of the treating cage lower bearing mount 8. The lower bearing mount 8 also includes a support plate 28 which is secured to a relatively large, hollow cage drive shaft 29 which extends downwardly through the bearing housing 12.

Contained within the cage drive shaft 29, and also within the bearing housing 12, is a hollow spindle drive shaft 30 supported on an upper bearing 31, received in the cage drive shaft 29, and engaging a lower bearing 32 also secured in the cage drive shaft 29. Contained coaxially within the spindle drive shaft 30 is an auger drive shaft 33 which is rotatably retained at the upper end 34 thereof by telescopic receipt into the sleeve bearing 26 and, at a lower portion 35 by resting on and extending through a bearing 36 secured with respect to the lower end 37 of the spindle drive shaft 30. The auger drive shaft 33 extends downwardly beyond the bearing 36 and has secured thereto an auger drive pulley or sprocket 38 and the rotating portion of a speed sensor signal generator 39. The upper end 34 of the auger drive shaft 33 terminates in a key projection 40 which is received in the key slot 25, whereby the auger 20 may be independently rotatably driven from the drive pulley or sprocket 38.

The spindle drive shaft 30 has the rotating portion of a speed sensor signal generator 45 fixed thereto above the auger drive pulley 38. Spaced above the generator portion 45 and also secured to the spindle drive shaft 30 is a spindle drive pulley or sprocket 46. Over the spindle drive pulley 46, in this example, is a cage drive pulley or sprocket 47 which is fixed to the lower portion of the cage drive shaft 29, the shaft 29 also supporting the rotating portion of a cage speed signal generator 48. Progressing upwardly along the coaxially shafts 29, 30 and 33, past the bearing housing 12 and beyond the cage support plate 28, is a drive pulley or sprocket 49 secured to the spindle drive shaft 30, whereby rotation of the spindle drive pulley 46 is reflected in rotation of the pulley 49.

Figure 6:
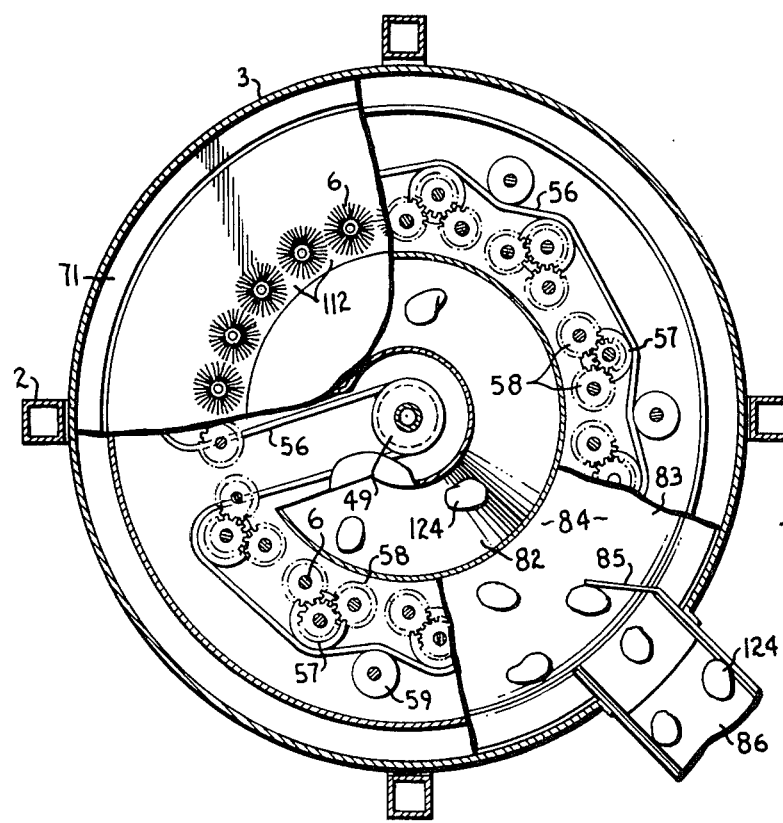
FIG. 6 is a horizontal cross-sectional view taken on the line 6—6, FIG. 2, showing spindle driving members with broken portions revealing adjacent structure.
Figure 7:
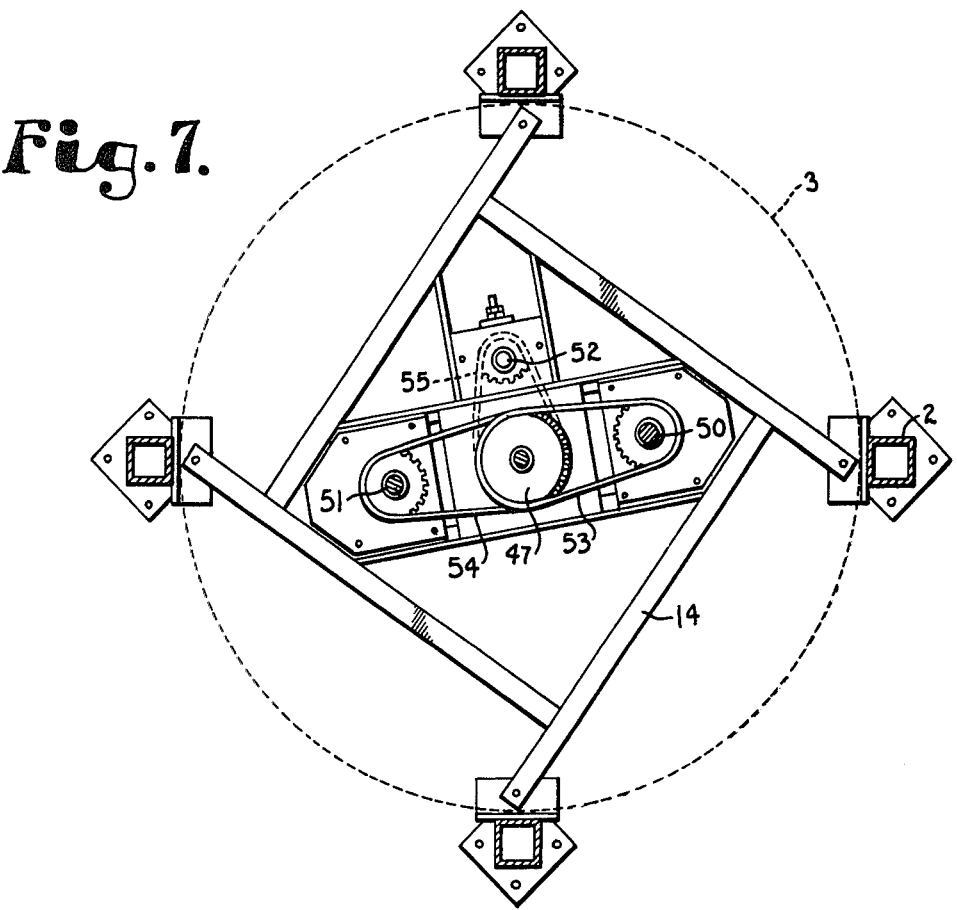
FIG. 7 is a horizontal cross-sectional view taken on the line 7—7, FIG. 2 particularly showing prime driving elements and associated supporting frame.
Figure 11:
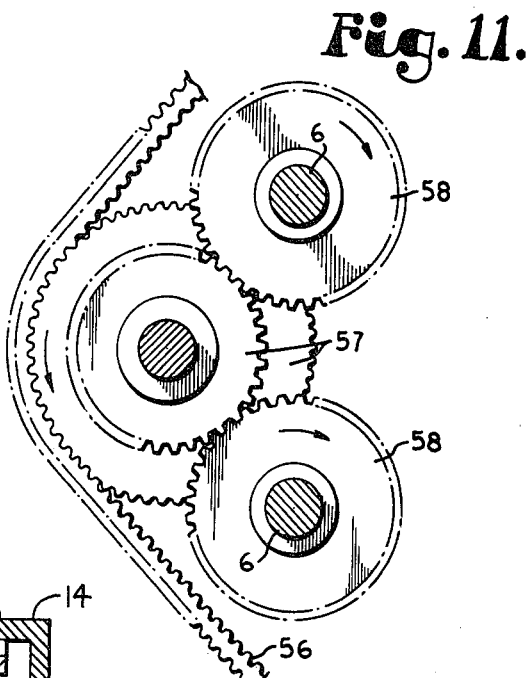
FIG. 11 is a fragmentary cross-sectional view showing, on an enlarged scale, a portion of the spindle driving arrangement of FIG. 6.

Referring to FIGS. 2 and 7, the drive assembly support 14 has three hydraulic motors mounted thereto designated 50, 51 and 52, said motors respectively having timing belt 53 engaged with the cage drive pulley 47, timing belt 54 engaged with the spindle drive pulley 46 and timing belt 55 engaged with the auger drive pulley 38. The drive pulley 49 on the upper portion of the spindle drive shaft 30 engages a timing belt 56 which, in turn, is threaded in serpentine fashion about the cage lower bearing mount 8, engaging drive sprockets 57 which drive respective pairs of gears 58 secured to the lower ends of the treating spindles 6, FIGS. 2, 6 and 11. Suitable idlers 59 guide the timing belt 56 through the proper path for simultaneous engagement with each of the drive sprockets 57.

Thus, by separately controlling the output of hydraulic drive motors 50, 51 and 52, the cage 5, treating spindles 6 and auger 20 may be rotated about their own axes independently at desired relative speeds and directions with respect to each other. The hydraulic pumps and related fluid transmission tubing connected to the hydraulic motors 50, 51 and 52 are conventional and not shown in order to more clearly illustrate the features of this invention.

Figure 4:
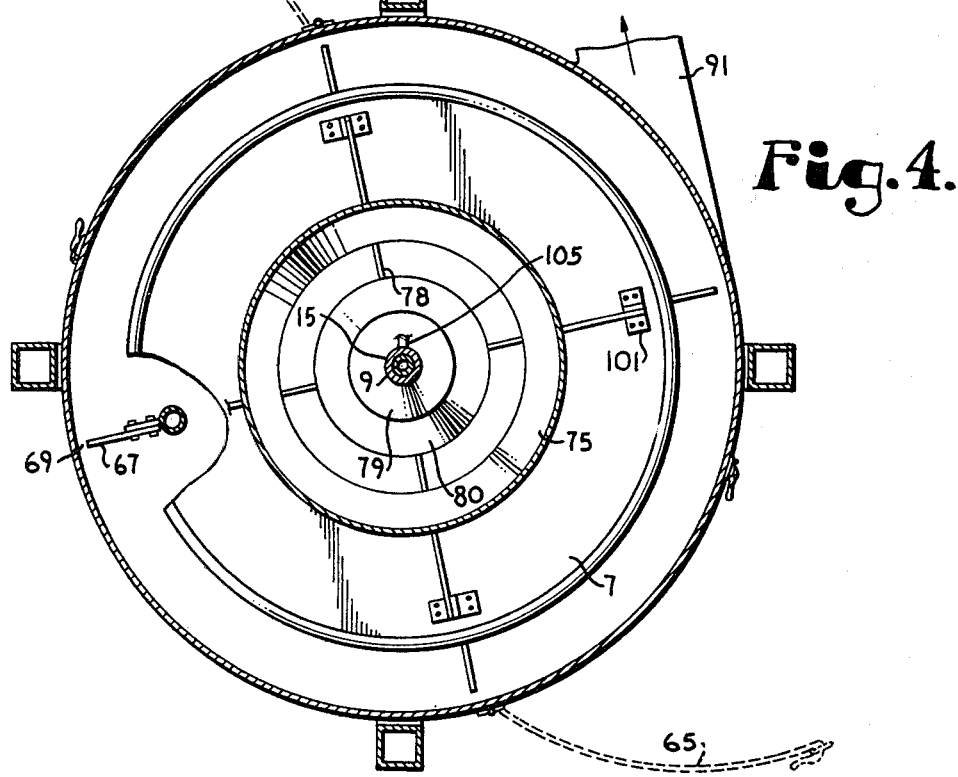
FIG. 4 is a horizontal cross-sectional view taken on the line 4—4, FIG. 2, showing a portion of the feeding funnel.

The housing 3, in this example, is cylindrical in shape and has hinged access doors 65 and 66 mounted on the curved side wall thereof, FIGS. 1 and 4, to provide convenient access to the treating spindles 6. Upon removal of one or more of the spindles 6, the auger 20 and adjacent internal structures are exposed for inspection and service.

Resilient flaps or wipers 67 are suitably mounted on the treating cage 5 and function to keep the interior surface 68 of the housing 3 clear of debris. In the example of FIG. 2, the chamber 4, defined by the housing 3, is divided into an upper portion 69 and a lower portion 70 by an annular ledge 71 secured to the housing interior surface 68. Likewise, the treating cage 5 carries a ring divider 72 which cooperates with the ledge 71 for the same purpose, FIG. 2.

A feed chute 75 is supported by the frame 2 and projects downwardly through the upper wall 76 of the housing 3. The chute 75 has a stationary upper portion 77 in the shape of a spiral funnel tapered inwardly as it moves downwardly, and a lower rotary accelerator portion 78 which is secured to and rotates with the treating cage upper bearing mount 7. The feed chute lower portion 78 has downwardly and outwardly sloping conical caps 79 and 80 which further serves to deflect incoming produce radially outwardly against the treating spindles 6 within the cage 5, as is detailed more fully below.

An appropriate conveyor 81 is positioned over the feed chute 75 so as to discharge produce thereinto for treatment.

The bottom flight of the auger 20 has a resilient wiper flap 82 associated therewith which helps guide the treated produce leaving the auger into a rotating exit chamber 83, partially formed with a conical wall 84 which tends to urge the produce radially outwardly within the chamber 83. This urging, in addition the dynamic centrifugal force still acting upon the produce, causes movement toward the periphery of the exit chamber 83 where the produce strikes a stationary deflector 85. This guides the produce through an opening 86 in the side wall of the housing 3, and onto an appropriate conveyor 87 by which the treated produce is carried to another station for further operation thereon.

Figure 37:
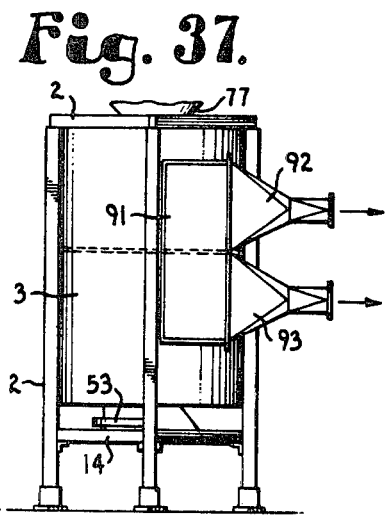
FIG. 37 is a side elevation similar to FIG. 36 but showing the air evacuation system divided into upper and lower sections to aid in classifying debris removable by air evacuation.
Figure 36:
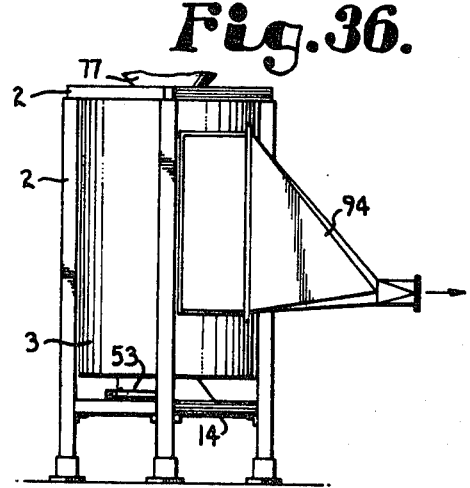
FIG. 36 is a side elevation of the treating apparatus showing an air evacuation duct communicating into the cage containing housing for removing light debris created during produce treatment.
Figure 3:
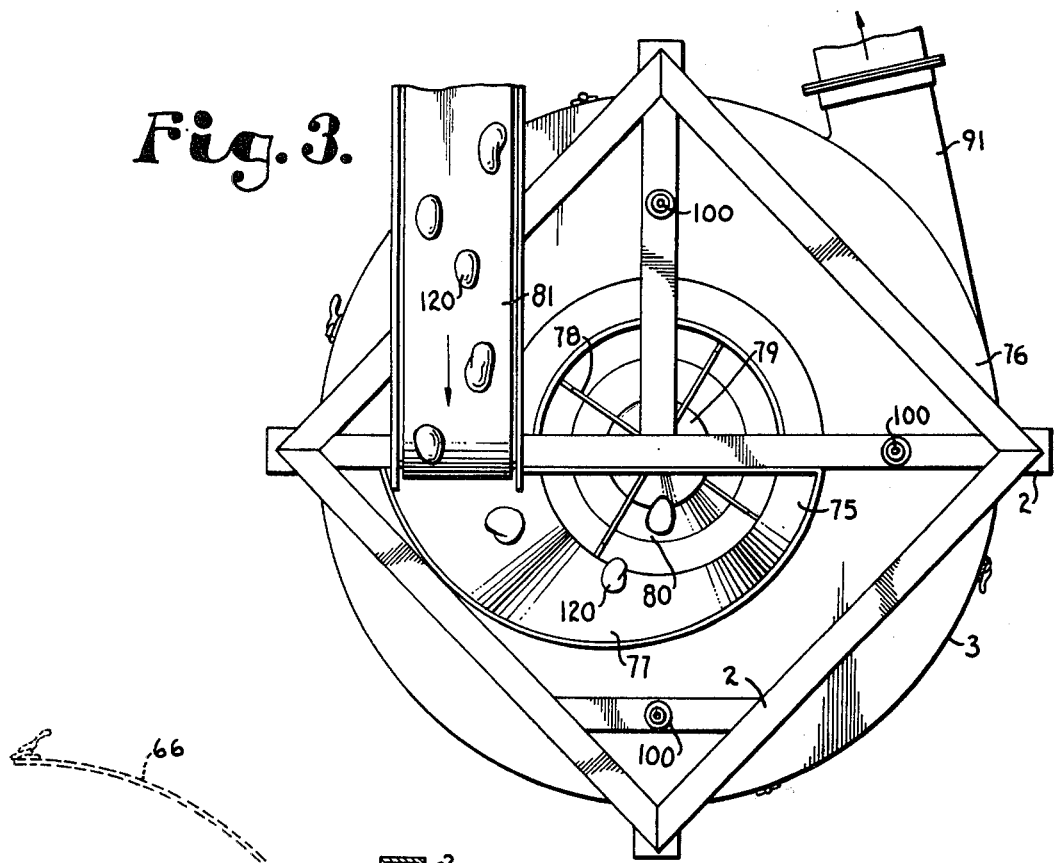
FIG. 3 is a horizontal plan view showing the top of the FIG. 1 apparatus, with produce being fed thereinto.

The peelings and debris which pass between the spindles 6 to the radially outer part of the chamber lower portion 70 are maintained in motion by the lower flaps or wipers 67 and find their way through an opening 88 in the housing 3 where they slide down a ramp 89 onto an exit conveyor 90 for travel to an appropriate processing station. The light particles removed from the produce and ejected to the exterior of the treating cage within the chamber 4 are preferably withdrawn by air suction through an exit duct 91 (FIG. 3) which also communicates through the side wall of the housing 3. In the example shown in FIG. 2 where the chamber 4 is divided into upper and lower portions 69 and 70, the duct 91 may also be divided into an upper portion 92 and lower portion 93 to segregate the initially removed debris, which is more likely to be composed of waste material such as soil, and the later removed material which is more likely to be salvageable into animal feed or other proteinrich products, FIG. 37. If such segregation is not desired, the entire duct 91 may be fed into the single exit 94, FIG. 36. Appropriate suction fans with collecting hoppers (not shown) are utilized to create the air flow through the chamber 4 and retain the withdrawn material.

As noted above, the weight of the cage 5 is supported by bearing structure within the housing 12, which is supported by the drive assembly support 14. In servicing the drive assembly, it is not necessary to first disassemble the cage and associated structure. Hangers 100 are suspended from the frame 2 and normally elevated to a point where they do not interfere with the rotation of the cage. However, when it is desired to remove the drive assembly support 14 and structure mounted thereon, the hangers 100 are lowered and engaged with suspension ears 101 on the cage upper bearing mount 7, whereby the cage may be suspended within the housing 3 while the drive assembly support 14 and associated structure is withdrawn downwardly for easy access thereto. In withdrawing the drive assembly support downwardly, the telescopic connection between the projection on the auger drive shaft 33 and key slot 25 on the lower end of the central axle 22 separates and may be later reengaged merely by alignment and axial reinsertion. After replacing the drive assembly, the hangers 100 are disconnected from the upper bearing mount 7 and raised to a non-interferring position, FIG. 2, until again needed.

One of the significant advantages of the described apparatus and method is an ability to normally function in absence of flushing liquid. However, occasionally it may be desirable to introduce liquids into the chamber 4 for cleaning and/or, sterilization of the apparatus, or under special conditions, such as the need for product preservation and/or surface treatment. For this purpose the central axle or shaft 22 supporting the auger 20 is hollow and has a series of selectively usable spray nozzles 102 spaced therealong. The hollow interior of the axle 22 communicates through a rotary seal 103 with the stationary bearing structure 15, which has a hollow interior 104 opening into an appropraite hose connection 105, FIG. 8.

In the example of FIG. 2, the treating spindles 6 are in the form of "straight" brushes which present a cylindrical abrasive surface 110 along the length of the spindle. The resiliency, diameter and length of the individual bristles 111 may vary considerably, however, operable bristles made of "6-12" Nylon (Du Pont Company, Wilmington, Delaware) between 0.014 and 0.018 inches in diameter and about 1¼ inches in length appear to be satisfactory for removing the dirt and skin from several types of common potatoes. Substantial variations in bristle characteristics, patterns and shapes may be utilized to increase efficacy for particular operations. Selected examples of such variations are discussed below.

Figure 12:
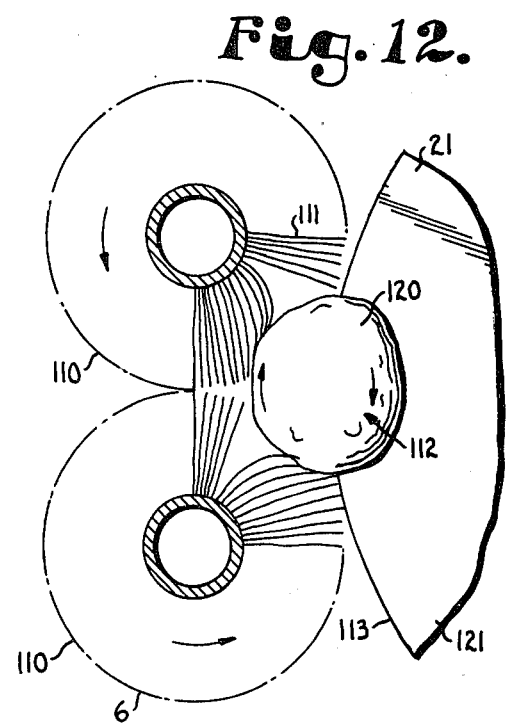
FIG. 12 is a fragmentary, cross-sectional plan view schematically illustrating an adjacent pair of corotating cage spindle brushes engaging a potato supported against gravitationally induced downward motion by contact with a control auger flight.

The apparatus shown in FIG. 2 is arranged so that the respective treating spindles 6 co-rotate, that is, adjacent spindles rotate in the same direction, at the same or different speeds. Referring to the example of FIG. 11, this is accomplished by driving sprockets 57 which are associated with gear teeth meshing with gears 58 (which may be different diameters) secured to the treating spindles 6. The elongated alveolus, cavity or pocket 112 (FIG. 12) formed between adjacent spindles 6 may receive produce therein whereupon the bristles, due to such co-rotation, induce spinning of the produce about a generally vertical axis while the brushing takes place. The periphery 113 of the auger flight 21 is positioned in contact or closely adjacent the treating spindles 6 whereby it may touch or terminate near the abrasive surface 110 formed by the bristles 111.

In operation, the cage 5, which has an upwardly directed axis 9, is rotated at a speed sufficient, at the interior radius thereof (that is, approximately at the elongated cavities 112) to maintain produce in continuous, centrifugal force contact against the abrasive material removing surface 110, but insufficient to prevent downward movement of the produce within the cage under the force of gravity.

Produce, in this example unpeeled, untreated raw and dirty potatoes 120, are introduced by means of the conveyor 81 into the feed chute 75 whereby they are directed downwardly into the chamber 4. The produce contacts the conical caps 79 and 80 by which they are deflected against the interior treating spindle surfaces 110, while being rotatably accelerated by the accelerator portion 78, FIG. 3. Some of the produce may not immediately reach the abrasive surfaces 110 because of interference with other produce in the area, whereupon they will usually, instead, contact an inner portion of the uppermost flight of the auger 20. The produce will then tend to roll outwardly and seek contact with an available open treating area of the abrasive surfaces 110.

Since the inwardly directed portion of the spindle surface 110 is irregular due to the elongated cavities 112 formed between the spindles, the potatoes are quickly engaged and accelerated into a circular path of rotation approximately equal to the circular rotational path and speed described by the inwardly facing portions of the surfaces 110. This path and speed is sufficient to maintain the produce in continuous centrifugal force contact against the surfaces 110, but insufficient to prevent downward movement of the produce within the cage under the force of gravity. Thus, without the auger 20, the produce 120 would slide or migrate downwardly at less than free fall (because of the resistance produced by centrifugal force pressure against the abrasive surface 110) but at a greater speed than is desired for optimum time exposure to the treating spindles.

If the auger 20 were rotated at the same speed as the treating cage (zero speed differential) there would be little opportunity for the produce to move downwardly through the treating cage, except for precession, assuming that the auger lead, spindle and cage rotation directions are compatible. However, a slight change from zero in the relative speed therebetween will cause the auger to "screw" with respect to the cage, whereby the auger flight position continually moves axially along any selected spindle cavity 112. For example, rotating the treating cage 130 rpm counterclockwise, with a cage having an effective diameter of 30 inches, to obtain a centrifugal force of about seven g., and the auger, with a four flight, right hand lead, 146 rpm counter-clockwise, (assuming no precession) a differential rotational speed of 16 rpm counter-clockwise is created in a direction which causes the auger flights to apparently screw or displace downwardly at a rate whereby the produce will have a cage residence time of about 15 seconds. Of course, if there is precession caused by cage spindle rotation, an appropriate adjustment in the differential rotational speed between the cage and auger must be made to obtain the desired residence time.

Thus, the flights 21 form an elongated spiral supporting surface which resists the gravitationally induced downward or axial travel of the produce through the cage by contact between the upper surface 121 and the lower portion of the produce, thereby increasing the cage residence time to that permitted by the controlled relative difference in rotational speed between the auger 20 and the treating cage 5. Through such relative rotation, the point of contact 122, FIG. 2, between the produce and the auger surface 121, which continually changes due to the relative motion between the auger and the produce, is displaced downwardly under controlled conditions, thereby accurately determining the descent time of the produce through the cage. This occurs while the produce is maintained against the abrasive surface 110 with a pressure accurately maintained by centrifugal force through controlling the rotational speed of the cage 5. Additionally, modifications in cleaning and/or peeling conditions in the cage may be produced easily by independently varying the speed of rotation of the individual spindles through the hydraulic motor 51 which, through the spindle pulleys 46, 49 and spindle drive shaft 30, control the rotational speed of the spindles independently of cage and auger rotation.

When the apparatus is in operation under a full load, certain produce pieces being treated will necessarily rest upon other produce pieces rather than directly upon the upper flight surface 121. However, the descent of such stacked produce will still be governed by the effective downward displacement of the flight contact point which, will be through the produce located between the flight and the produce stacked thereabove. For most efficient operation, the apparatus will normally not be loaded beyond the point where each produce piece in the treating cage 5 can easily find an exposed area of abrasive surface 110 to bear against. Once the produce piece has found its position against the abrasive surface, whether or not it directly contacts the flight surface 121, and notwithstanding some precessing or jumping between cavities 112, the conditions are not created where there is considerable tumbling of the produce, one over the other, which is a common feature of the prior art.

As the produce is abraded (brushed), particles 123 removed therefrom become independently subjected to the centrifugal force within the cage 5 and rapidly find their way between adjacent treating spindles 6 to the exterior of the cage. However, the particles are contained within the interior of the housing 3, from which they are withdrawn either by air suction through the exit duct 91 or discharged through the opening 88 onto the exit conveyor 90, for processing.

The respective speed sensor signal generators 39, 45 and 48 are connected to appropriate meter displays (not shown) whereby operating parameters may be continually monitored. The cleaned and/or peeled produce 124 drop off the lowermost turn of the flight from which they fall into the exit chamber 83, aided if necessary by the wiper flap 82, and strike the stationary deflector 85 whereupon they are urged through the opening 86 onto the conveyor 87 for transfer to further processing or packaging apparatus.

Many variations may be provided in the basic apparatus and method for producing changes in cleaning and peeling conditions to better suit specific species and types of produce.

Figure 13:
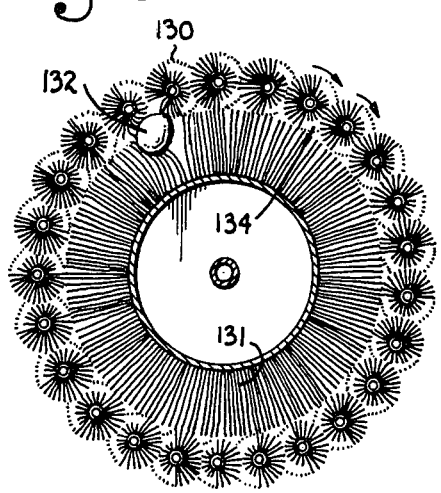
FIG. 13 is a horizontal cross-sectional view through a modified form of treating cage, wherein the produce is supported against uncontrolled, gravitationally induced, downward motion by engagement in helical or screw depressions in mating, spiral shaped spindles, and further illustrating a modified form of central cage member as a straight or cylindrical brush.
Figure 14A:
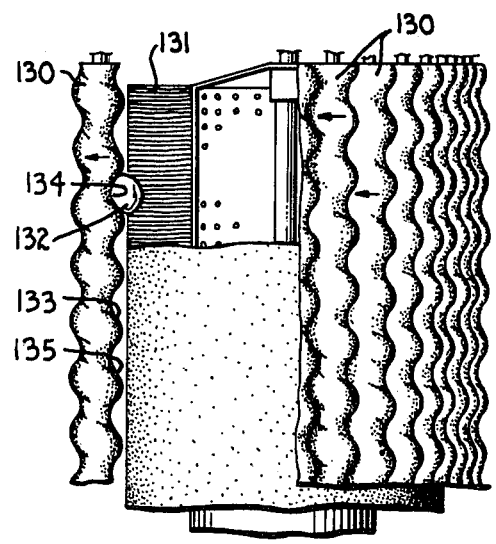
FIG. 14a is a fragmentary side elevation depicting the modified structures of FIG. 13.
Figure 14B:
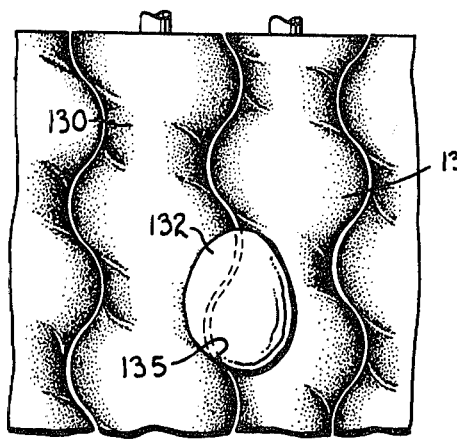

One variation relates to treating spindle shape and is illustrated by FIGS. 13, 14a and 14b, wherein modified brush treating spindles 130 are formed into a spiral or screw configuration of the same hand and intermesh, so that the adjacent peaks and valleys of the screw flights project into each other. This allows formation of an unperforated treating cage wall, except for slight lateral clearance to avoid excessive interference between adjacent spindles. In co-rotating the respective spindles, that is, rotating all about their own axes in the same direction, there is a downward ridge or flight displacement over the entire inner surface of the cage. By substituting for a central screw member, such as the auger 20, a "straight" brush 131, the produce 132 will be urged against the interior cage surface 133 and maintained thereagainst under the centrifugal force produced by accelerating the produce 132 to cage rotational speed.

The produce 132 will tend to find a pocket 134 between screw projections or flights on a spindle 130 and further tend to locate in the cavity 134 formed between adjacent meshed spindles 130. The produce, thus, will be simultaneously acted upon by the abrasive surface of adjacent spindles 130 as well as the abrasive surface presented by the central brush 131 which rotates relative to the cage. The produce is restrained against gravity induced downward motion within the cage by the lower flight or flights 135 of the pocket 134 within which the produce is cradled or nested, FIG. 14b. The rotation of the spindles 130 will, in this case, determine the downward displacement of the produce 134 within the cage, thus controlling the cage residence time while the produce is being treated.

Figure 14C:
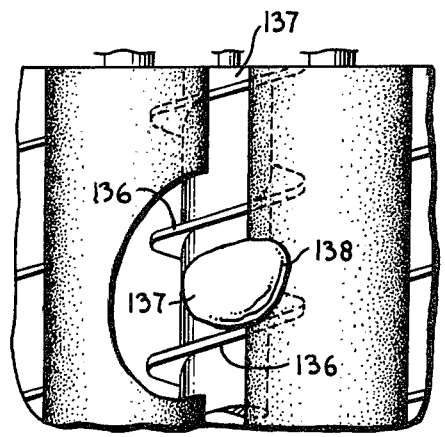
FIG. 14c is a fragmentary side elevation showing a further modified form of treating cage wherein the abrasive brushes are spaced apart and have screw slots therein receiving the flights of an intermediate cage spindle screw.
Figure 14D:
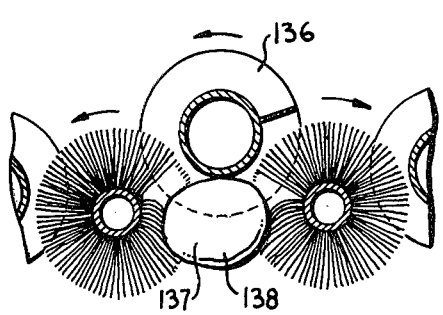

A variation of the modification shown in FIGS. 13, 14a and 14b is illustrated in FIG. 14c and utilizes spaced-apart treating spindles with a screw spindle therebetween. The screw spindle has a thin screw flight 136 engaged with the treating spindles with bristles of treating spindles reaching into the space 137 between the flights to engage produce 138 received therein. The treating spindles can be rotated independently of the screw spindles for controlling the produce cage residence time. This variation may be used with or without a central brush such as brush 131 (FIGS. 13 and 14a), as desired.

Figure 15:
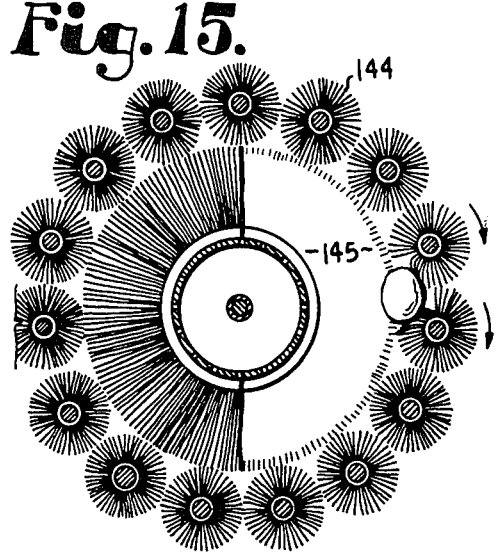
FIG. 15 is a horizontal cross-sectional view through a still further modified form of treating cage wherein the central member is an auger with brush flights.
Figure 16:
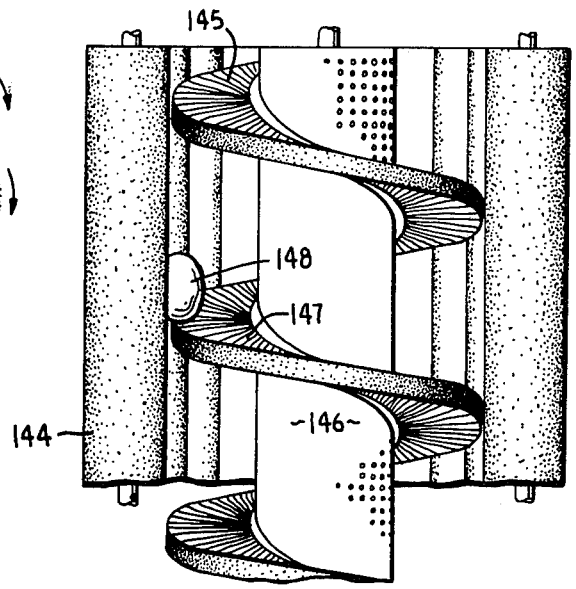
FIG. 16 is a fragmentary side elevation depicting the structure of FIG. 15.
Figure 23:
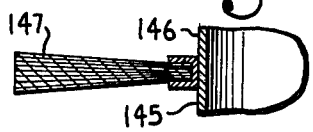
FIG. 23 is a fragmentary cross-sectional detail illustrating the brush flight of the central member of FIGS. 15 and 16.

Another modified form of this invention is illustrated in FIGS. 15, 16 and 23 wherein the cage treating spindles 144 are similar to those described in connection with the embodiment of FIG. 2, however, the center gravity drop resisting member takes the form of a brush auger 145, instead of the plain flight auger 20 of FIG. 2. In the embodiment of FIGS. 15, 16 and 23, the bristles project generally radially from a center rotating support 146 in a spiral pattern, producing an upper flight surface 147 which functions not only to contact the produce 148 for controlling the descent thereof through the treating cage, but also to provide additional brushing or abrading. It is noted that the flight surface 146 is formed into a left hand spiral which is opposite to that of the FIG. 2 auger. Relative rotational directions will, therefore, also be opposite for similar function.

Figure 17:
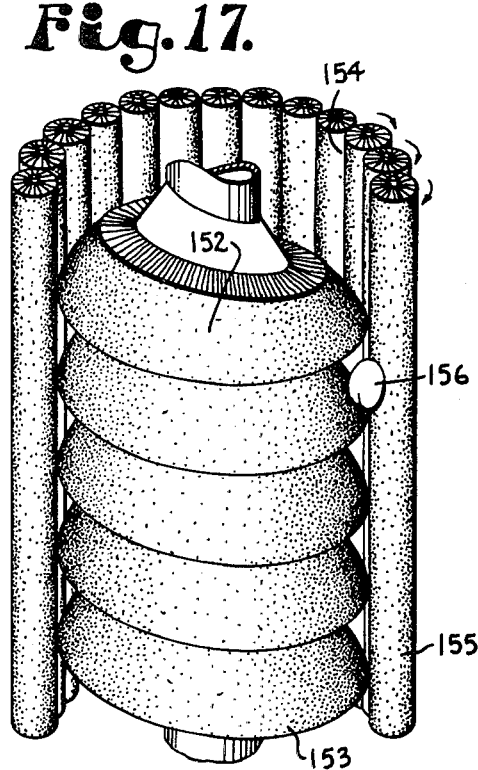
FIG. 17 is a fragmentary perspective view showing a yet further modified form of treating cage wherein the central member is a "drooping" brush auger.
Figure 18:
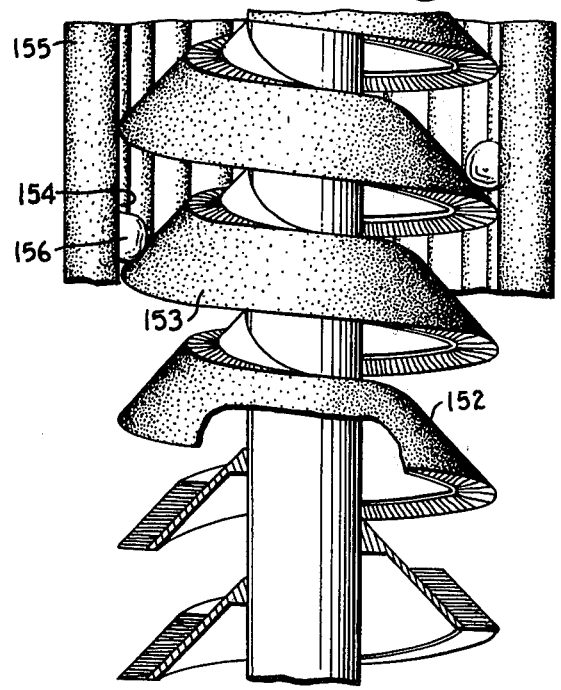
FIG. 18 is a fragmentary side elevation depicting the structure of FIG. 17.

FIGS. 17 and 18 display a further modified form of this invention which is somewhat similar to that of FIGS. 15 and 16, however, the central brush auger 152 has the upper flight surface 153 sloping downwardly as it extends outwardly, providing a wedge pocket 154 between the surface 153 and the cylindrical surface brush treating spindles 155. The produce 156 normally becomes wedged in the pocket 154, thereby being more completely exposed to relatively moving abrading surfaces during travel through the treating cage. The brush auger 152 functions in the same manner as described in connection with the embodiments of FIGS. 2 and 16 by providing supporting contact against the lower portion of the produce to control the descent of the produce downwardly, the removed material being separated by centrifugal force as in the above described structures.

A further modification of this invention is shown in the structure of FIGS. 19a, 19b, 19c and 20. Adjacent treating spindles 162 and 163 are spiraled in opposite directions (hand), but rotate in the same direction, whereby spindle 162 screws upwardly and spindle 163 screws downwardly. The auger flight 164 functions as in previously described embodiments. This structure is particularly suitable for produce 165, FIG. 19b, of elongated configuration such as Russett potatoes which often resume a cucumber-like shape. Such produce sometimes has a tendency to lie flat on the auger flight 164 whereupon it will not be subjected to the more complete abrading surface contact and rotating action which it would receive if nested in the elongated cavity or pocket 166 formed between the spindles 162 and 163.

When the centrifugal force urges the produce 165 against the spindles 162 and 163, the flight on the spindle 163 tends to not only abrade or brush the produce in the direction of spindle rotation, but also urge a portion of the produce downwardly against the auger flight 164. The adjacent spindle 162, however, tends to urge the produce upwardly away from the auger flight 164, the net result being that the produce will quickly be upended and received in a pocket 166 with its axis generally parallel to the axis of the spindles, as shown at 167, FIGS. 19a and 19c. The produce will tend to stay in this position during residence time in the cage, with the respective spindles 162 and 163 making abrading passes while the produce is turned on its axis and controlled in descent speed by the lowering of the support provided by the auger flight 164.

Figure 19A:
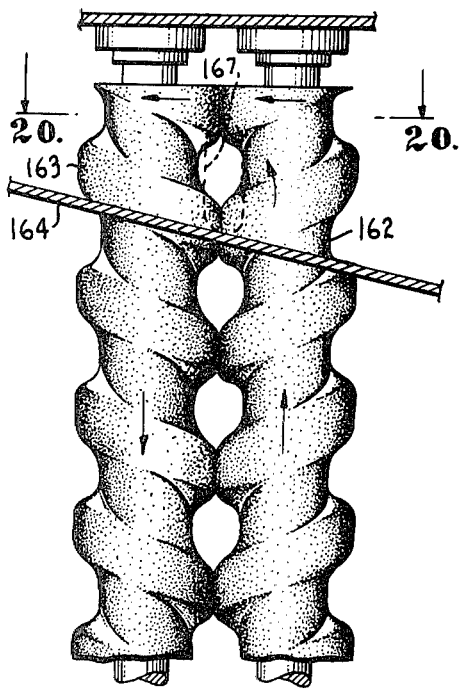
FIG. 19a is a fragmentary side elevation illustrating an additional modified cage spindle arrangement which utilizes co-rotating spiral or screw cage spindles with opposite hand flights, inducing rotation or unpending of produce within the cage about a horizontal axis.
Figure 20:
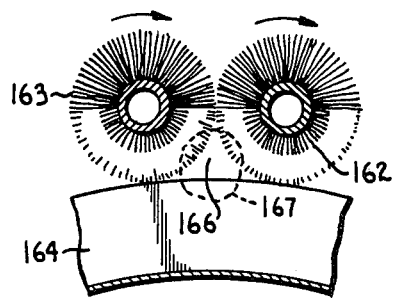
Figure 21A:
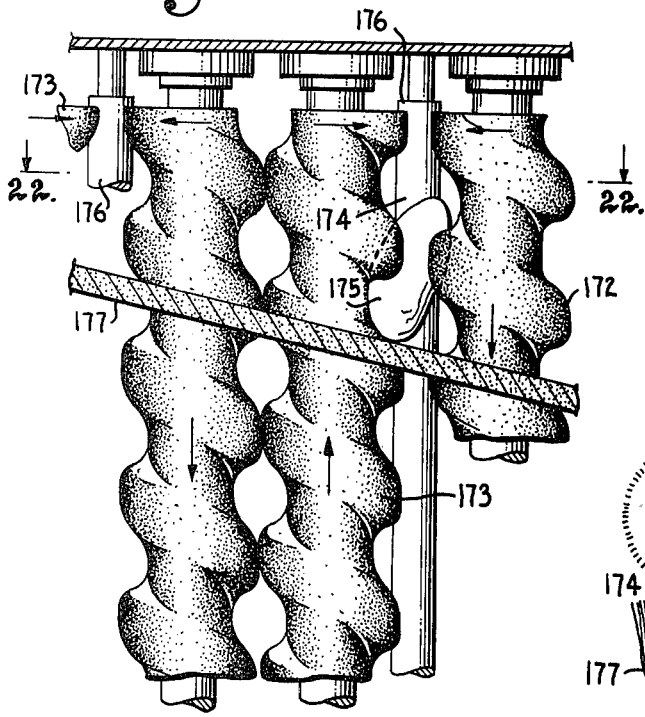
FIG. 21a is a fragmentary side elevation showing a modification of the structure in FIGS. 19a and 20, utilizing spiral or screw spindles of the same hand but with adjacent spindles rotating in opposite directions. Retaining bars are added to prevent excess pulling into grasping pockets.
Figure 22:
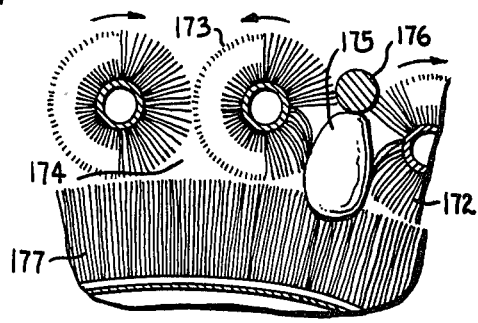

FIGS. 21a and 22 are directed to a modification of the structure of FIGS. 19a and 20, varying therefrom in that adjacent spindles 172 and 173 are spiral with the same hand but rotated in opposite directions to produce a similar produce lifting and turning effect. However, since every other set of adjacent spindles will be rotating with respect to each other in an opposite direction, the spindle cavities 174 between such counter rotating spindles will tend to suck in the produce 175, causing damage thereto or, under some circumstances, ejection through the cage wall into the outer portion of the apparatus housing chamber. To prevent this, a retaining bumper or rod 176 is placed between the counter rotating spindles 172 and 173 in a position which will maintain the produce 175 in efficient abrading relationship with the spindle brushes, but prevent the produce from penetrating the cavity 174 to an extent where it is mechanically caught and damaged, or ejected to the exterior of the cage.

For improved efficiency, it may be desirable to permit the rod 176 to freely rotate so as not to inhibit the rotation of the produce 175 in the pocket. Under other conditions, it may be advantageous to drive the rod 176 about its axis. The auger flight 177, in this case is formed of elongated brush bristles and functions as described in connection with FIGS. 15, 16 and 23.

As with the other forms described herein, since there are complex force producing, multiple contacts against the produce, they may not stay within the same spindle cavity during the entire residence time but, rather, tend to jump and move from cavity to cavity while they rotate end-to-end and along their own axes, the result being an even cleaning and/or abrading treatment over the entire produce surface.

Referring to FIG. 24a, another modification of the center residence time controlling member, or auger, is identified by the reference numeral 182. The auger 182 is similar to the auger 20 described above in connection with FIG. 2 but the spiral flights 183 thereof have spaced vertical drops or steps 184 thereon to promote agitation and turning of the produce as they are allowed to move downwardly under the force of gravity within the treating cage 185.

Figure 24B:
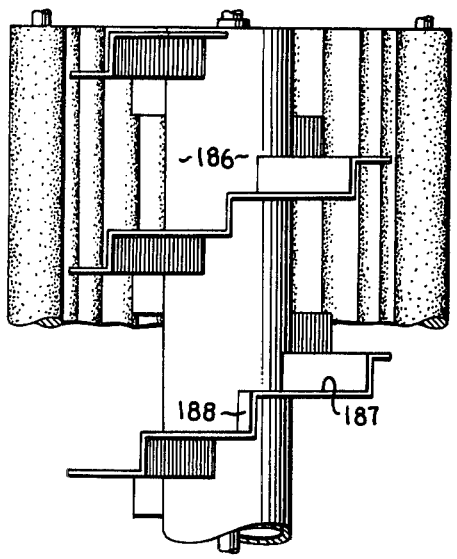
FIG. 24b is a view similar to FIG. 24a but showing a further modified form of plain flight auger which is composed of vertical and horizontal step portions forming the spiral.
Figure 19B:
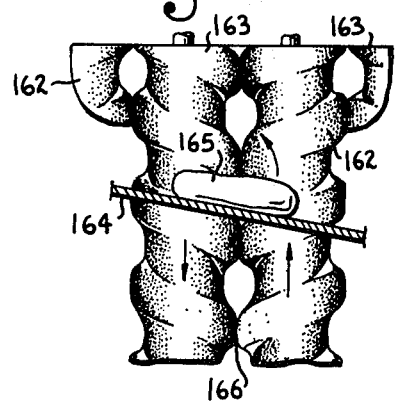
FIGS. 19b and 19c are fragmentary side elevations similar to FIG. 19a and showing an elongated potato sequentially rotating from a position resting generally horizontally on the auger flight (FIG. 19b) to a vertical orientation (FIG. 19c) where it fits in the pocket between adjacent spindles.
Figure 19C:
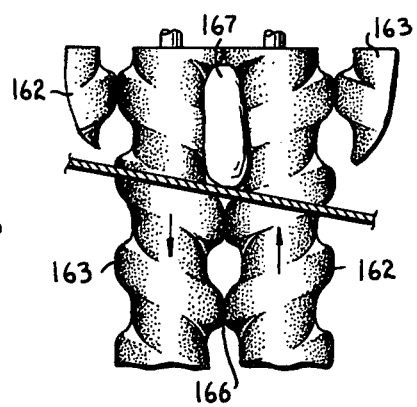

FIG. 24b shows an auger 186 somewhat similar to the auger of FIG. 24a, but further modified in that the spirally sloping flight portions are eliminated and the entire flight is made up of generally horizontal steps 187 and vertical steps 188 which "ratchet" downwardly in a spiral pattern. As above, the function of the auger 186 is to resist the gravitationally induced downward travel of the produce through the cage, however, with the step structures disclosed, there is a tendency to also gently promote the turning and rotation of the produce about several axes, so as to better insure even, whole surface treatment, without harsh tumbling.

Figure 25:
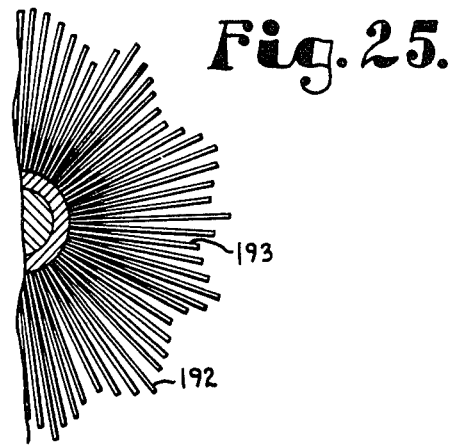
Figure 26:
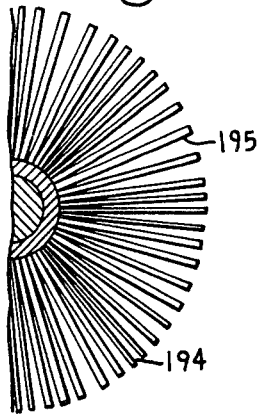
Figure 27:
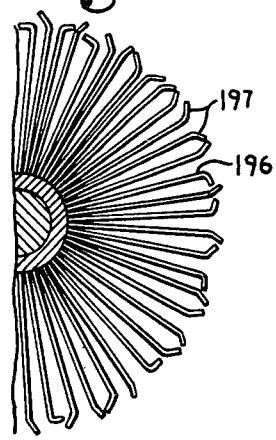
Figure 28:
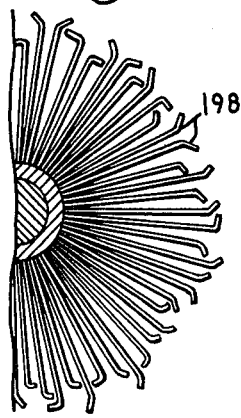
Figure 29:
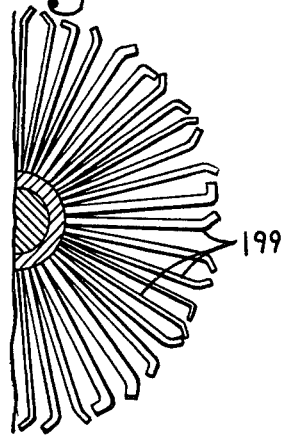

The bristle configuration chosen for the abrading brushes can have a profound effect upon the type of surface treatment applied to the produce within the cage. FIGS. 25-31 show various utilitarian bristle patterns and shapes. FIG. 25 demonstrates the use of radially projecting uniform diameter bristles of varying radial length, which promotes poking with abrasion. FIG. 26 demonstrates bristles of varying diameter, and therefore varying resiliency, but of equal radial length. FIG. 27 shows bristles 196 having the free ends bent into a short foot 197 to aid entrance into produce surface cavities for digging and prying out dirt particles and the like. FIG. 28 shows a combination of the structures of FIG. 25 and FIG. 27 wherein the bristles 198 are of both varying length and have the free ends bent to a foot portion. FIG. 29 combines the structures of FIGS. 26 and 27 whereby the bristles 199 are of different thickness, and therefore of different resiliency, and yet have the free ends bent into foot portions. FIG. 30 combines the features of FIGS. 25, 26 and 27 whereupon the bristles 200 assume variations in radial length and diameter, while selected bristles have the free ends bent into foot portions. FIG. 31 demonstrates another variation which combines the features of FIGS. 25 and 26, but modified in that the bristles 201 do project at angles from the radial.

FIG. 32 shows a bristle 205 having a hammer-shaped free tip 206 thereon for less "poking" but a greater scraping action. FIG. 33 illustrates a bristle 207 having a barb shaped tip 208 thereon which is efficient in partially digging into the produce surface and hooking a particle of debris for withdrawal. FIG. 34 demonstrates a bristle 209 of crinkly or zig-zag configuration which continuously presents an angled termination regardless of wear.

Figure 35:
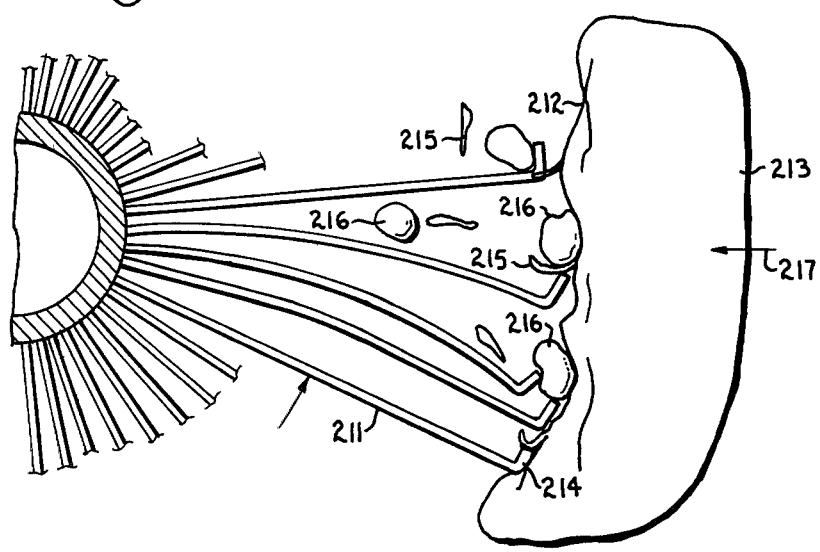
FIG. 35 is a fragmentary, somewhat schematic cross-sectional view showing footed cage spindle bristles engaging produce epidermis and removing foreign particles and surface skin pieces therefrom.

FIG. 35 somewhat schematically illustrates bristles 211 abrading the surface 212 of a produce piece 213. In this example the bristles 211 terminate in feed 214 which flake off particles 215 of the produce epidermis, and also dig out and dislodge dirt particles 216 embedded in the surface under treatment. This is accomplished while the produce 213 is urged radially outwardly of the cage axis under centrifugal force, in the direction indicated by the arrow 217.

Figure 19D:
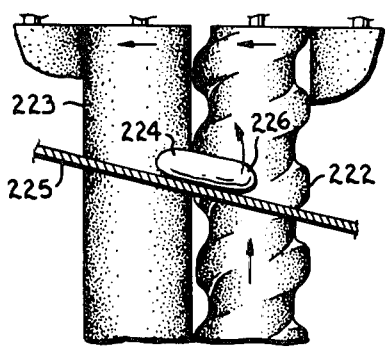
FIGS. 19d and 19e are sequential fragmentary side elevations similar to FIGS. 19b and 19c but utilizing a cylindrical brush spindle adjacent a spiral spindle for rotating horizontally oriented produce to a vertical spindle pocket engaging position.
Figure 19E:
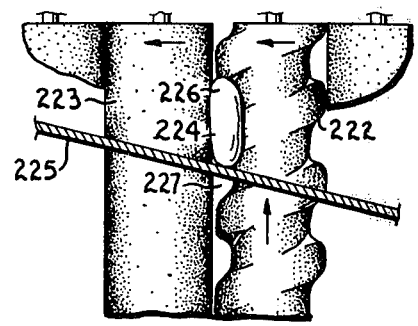

In the embodiments described above in connection with FIGS. 19a, 19b, 19c and 21a, all the treating spindles are spiraled. A useful variation of this concept is shown in FIGS. 19d and 19e wherein a spiral or screw brush spindle 222 is coupled with one or more straight or cylindrical brush spindles 223, the respective spindles being rotated in the same direction and the spindle 222 having a spiral hand such that it "screws" upwardly. With this configuration, elongated produce, which sometimes rests flat on the auger flight 225, tends to have one end 226 urged in a vertical direction. The end 226 is thereby raised with respect to the auger flight 225, whereupon the produce 224 is more likely to drop into the cavity 227, where it is exposed more fully to the treating surface as above described.

Figure 21B:
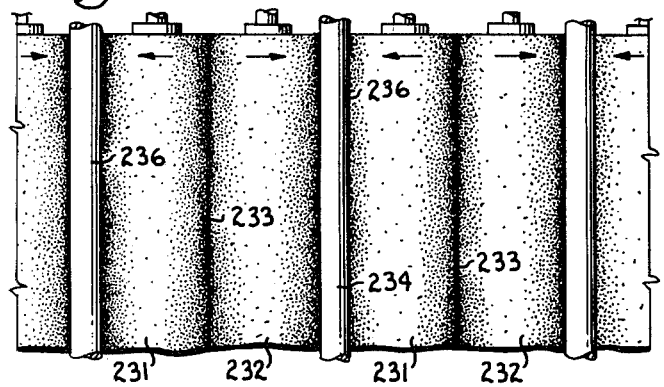
Figure 21C:
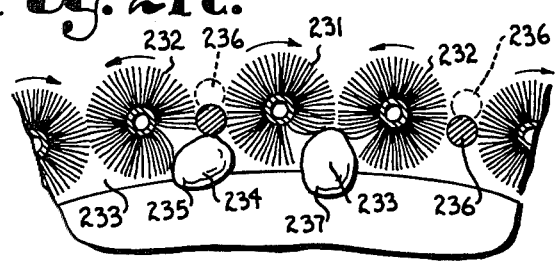
FIG. 21c is a fragmentary horizontal cross-sectional view further showing the arrangement of FIG. 21b.

Counter-rotating spiral or screw spindles in combination with cavity retaining rods were described in connection with the embodiment of FIGS. 21a and 22. Such retaining rods may also be utilized to advantage in connection with "straight" spindles of the type utilized in the example of FIG. 2. FIGS. 21b and 21c show straight, adjacent brush spindles 231 and 232 counterrotating whereby cavities of two types are formed, the first cavity 233 brushing inwardly toward the axis of the cage, and second cavity 234 brushing outwardly and tending to catch or swallow and damage produce 235 unless a bumper or rod 236 is supplied. As in connection with the embodiment of FIGS. 21a and 22, the rod 236 may be fixed, free to rotate on its axis, or driven to help promote the rotation of produce in the cavity 234. Produce 237 in the inwardly brushing cavity 233 is also subject to the desired abrasion but is normally less stable since the produce is urged radially inwardly against the centrifugal force of the spinning cage. Thus, a portion of the produce pieces within the cage are always in a relatively unstable state, thereby promoting complex movement thereof with attendant full surface treatment.

Also desirable in connection with cavity retaining rods is the ability to adjust same radially of the cage so as to retain the produce deeper or shallower in the spindle cavity, as needed. Such an adjustment is illustrated in FIG. 21c where typical alternate positions of the rod 236 are shown by broken and solid lines.

Figure 38:
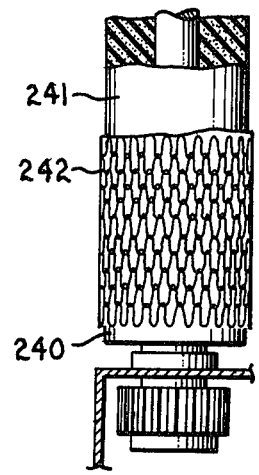
FIG. 38 is a fragmentary view of a fast cutting cage spindle having an abrading surface formed of interlooped, relatively hard ribbon sleeved over a soft, resilient cylindrical core.

Although various specific forms of brush spindles have been referred to above, this invention is not to be limited thereto. For example, treating surfaces other than brushes could be better suited for particular functions. High rate surface removal may call for abrasive particles embedded in a soft matrix (not shown). Also, it may be desirable to change the characteristics of the spindle treating surface along the axial length thereof, that is, the possibility of the upper portion of the spindle carrying soft rubber fingers, the central portion stiff bristles and the lower portion soft, polishing bristles (all not shown). Still another example is illustrated in FIG. 38 which utilizes for the treating spindle 240 a soft, resilient cylinder 241 over which is sleeved and secured, meshed or loop interlocked flat, hard, non-round wire or ribbon 242, such as synthetic resin or stainless steel. The ribbon 242 will rapidly cut and clean the surface of produce while easily releasing the debris.

Still further, it is contemplated that combining varying relative speeds and/or diameters of adjacent spindles, especially in conjunction with variations in treating surface characteristics, will produce a great selection of operating parameters from which to choose.

Therefore, it is to be understood that although certain specific examples of this ivention have been illustrated and described, a large number of other variations and permutations are possible and will occur to those skilled in the art from a reading of this specification.

It is to be further understood that this invention is not to be limited except as set forth in the following claims.

What is claimed and desired to be secured by Letters Patent is:

1. A method of removing material from the surface of produce and separating the removed material from the resultant mixture of produce and removed material, comprising the steps of:
   (a) rotating an upwardly directed cage formed of elongated rotating spindles with a material removing surface thereon, said cage rotation being at a rotary speed sufficient, at the interior radius thereof, to maintain produce in a circular path of rotation while in continuous centrifugal force contact against said material removing surface but with said centrifugal force contact insufficient to prevent downward movement of produce within said cage under the force of gravity,
   (b) urging produce, from which material is to be removed, into said cage and into engagement with said material removing surface,
   (c) accelerating the produce substantially to said rotary speed within said cage whereupon said produce travels substantially at said rotary speed in contact with said material removing surface,
   (d) displacing the produce downwardly through said cage under the force of gravity,
   (e) resisting said downward gravitational displacement with an effectively downward moving supporting area, said supporting area taking the form of a substantially continuous spiral surface, thereby increasing the cage residence time of the produce,
   (f) effectively lowering said supporting area, with the produce in contact therewith, at a predetermined rate, thereby utilizing both gravity and said supporting area for controlling the period of produce descent along said spindles, and
   (g) separating removed material from within said cage by centrifugal force.

2. The method of removing material from the surface of produce comprising the steps of:
   (a) urging said produce into engagement with rotating spindles having a material removing surface thereon,
   (b) maintaining said produce in a circular path of rotation at a speed sufficient to maintain said produce engaged with said rotating spindles through centrifugal force;
   (c) moving said produce downwardly and longitudinally of said spindles under the force of gravity,
   (d) resisting said downward movement of said produce by contacting said produce with an effectively downward moving supporting area, said supporting area taking the form of a substantially continuous spiral surface, and (e) effectively lowering said supporting area, with the produce in contact therewith, at a predetermined rate, thereby utilizing both gravity and said supporting area for controlling the period of produce descent along said spindles.

3. The method as set forth in claim 2 wherein:
(a) said spindles form a rotating cage and
(b) including the step of inducing a relative rotation between said spiral surface and said cage to produce said effective downward movement of said supporting area with said cage.

4. The method as set forth in claim 2 wherein:
(a) said material removal is primarily through brushing.

5. The method as set forth in claim 2 wherein:
(a) said produce resisting contact is produced by bristle engagement.

6. The method as set forth in claim 2 including the step of:
(a) inducing rotation of elongated produce on its longitudinal axis with said produce axis generally parallel to the axis of said spindles.

7. The method as set forth in claim 2 including the step of:
(a) capturing said produce in an abrading pocket during at least a part of said area lowering.

* * * * *